Aug. 17, 1965   A. W. JOHNSON   3,200,679
WORKPIECE LOADING AND UNLOADING APPARATUS
Filed Aug. 2, 1962   8 Sheets-Sheet 1
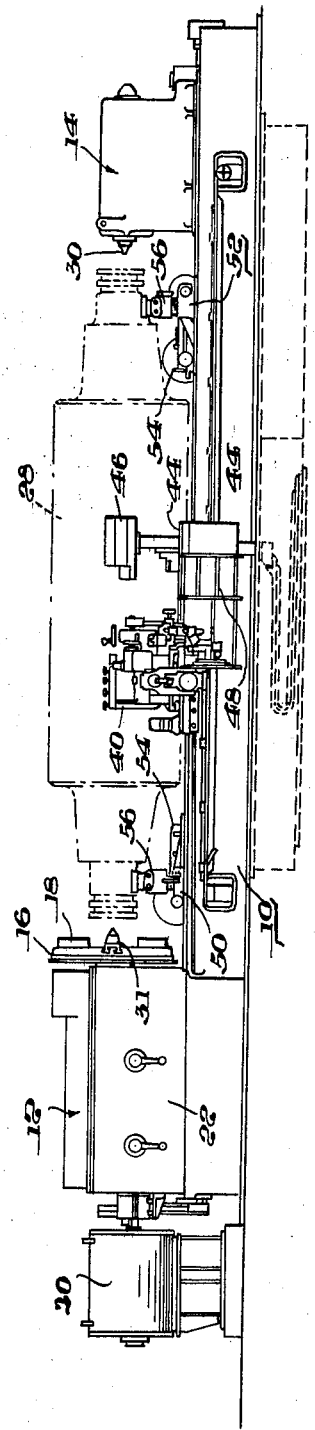
INVENTOR.
ARTHUR W. JOHNSON
BY Thomas H. Murray
his ATTORNEY

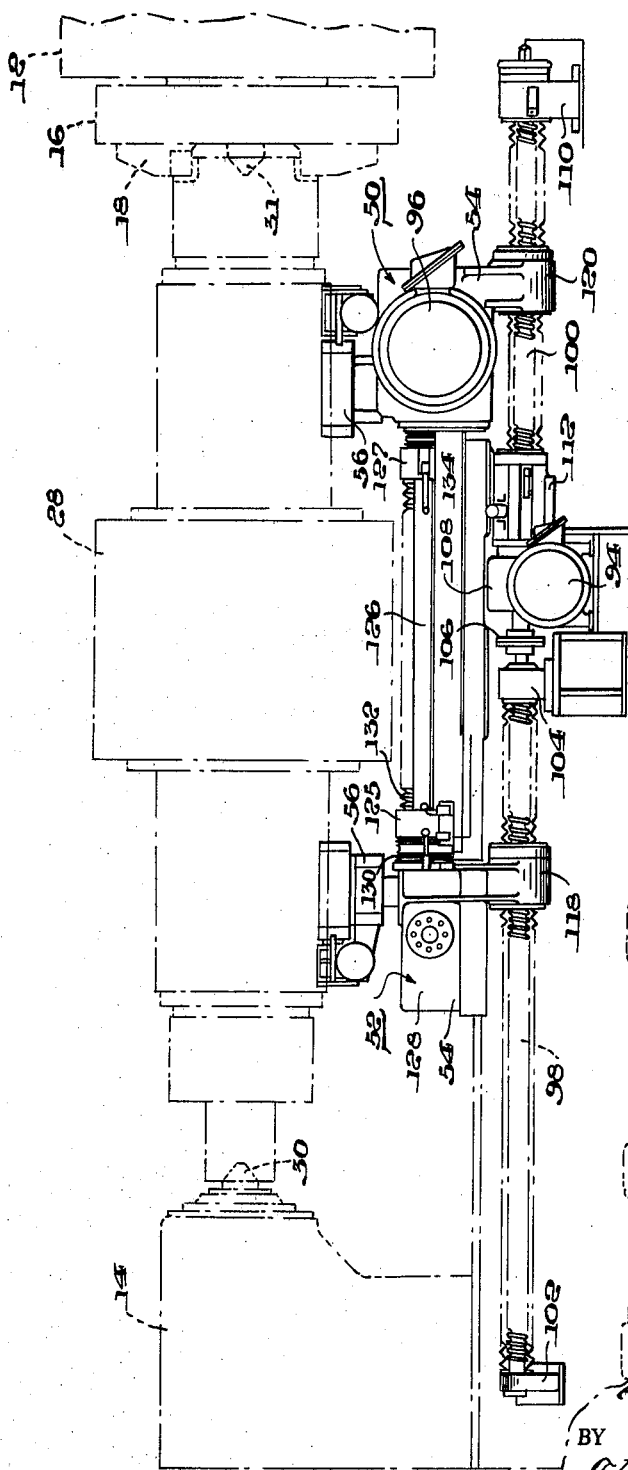

Aug. 17, 1965   A. W. JOHNSON   3,200,679
WORKPIECE LOADING AND UNLOADING APPARATUS
Filed Aug. 2, 1962   8 Sheets-Sheet 3
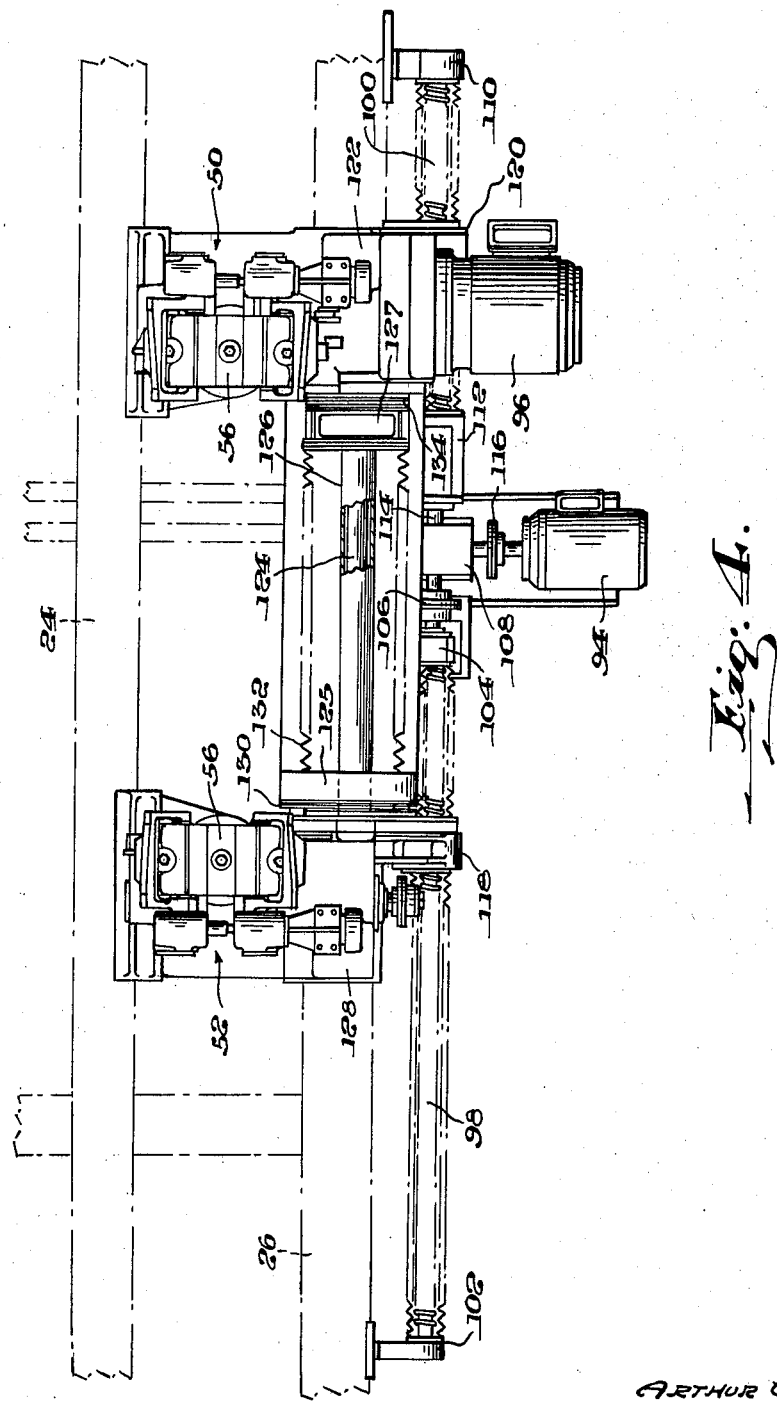
INVENTOR.
ARTHUR W. JOHNSON.
BY Thomas H. Murray.
his ATTORNEY.

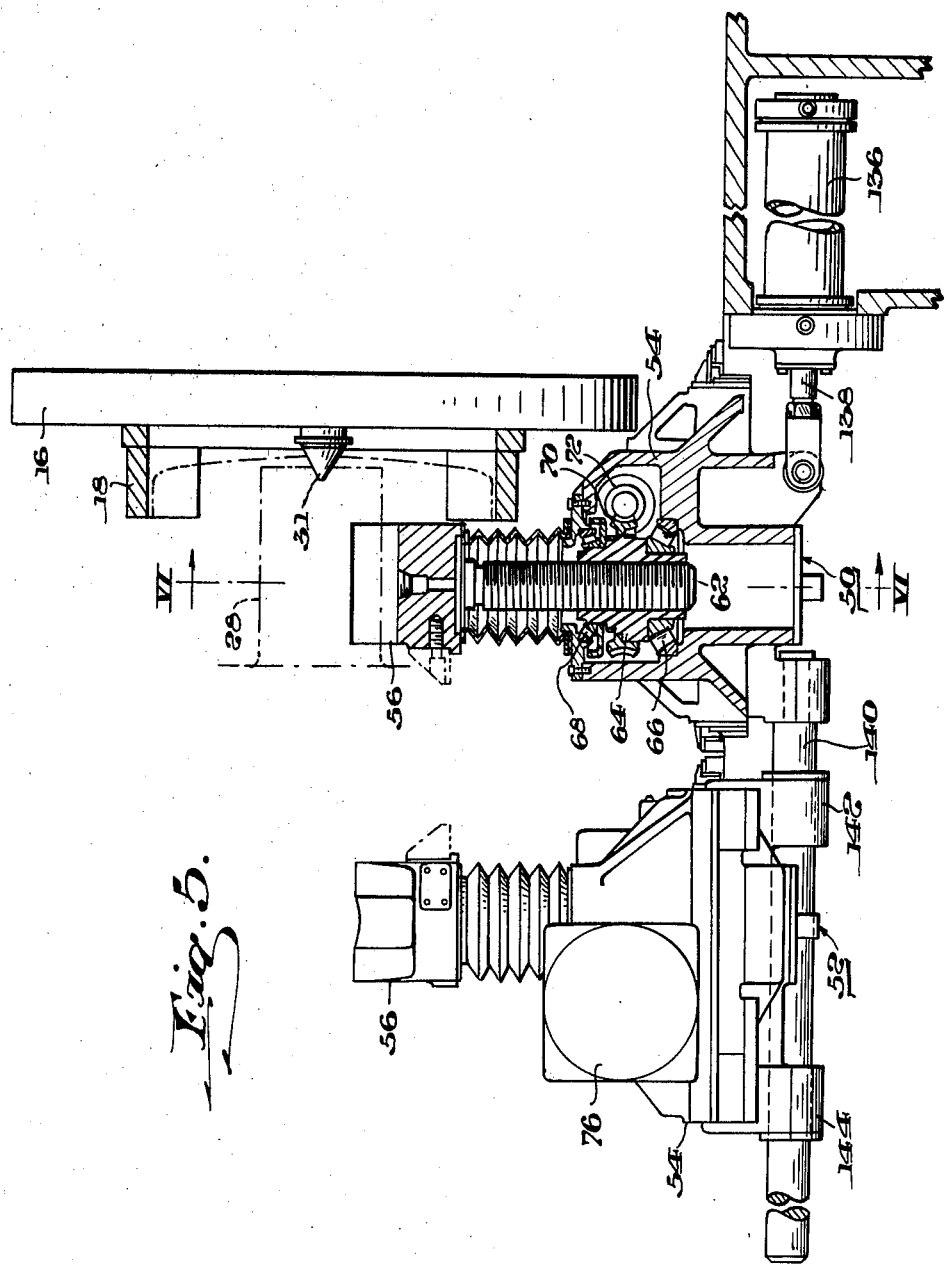

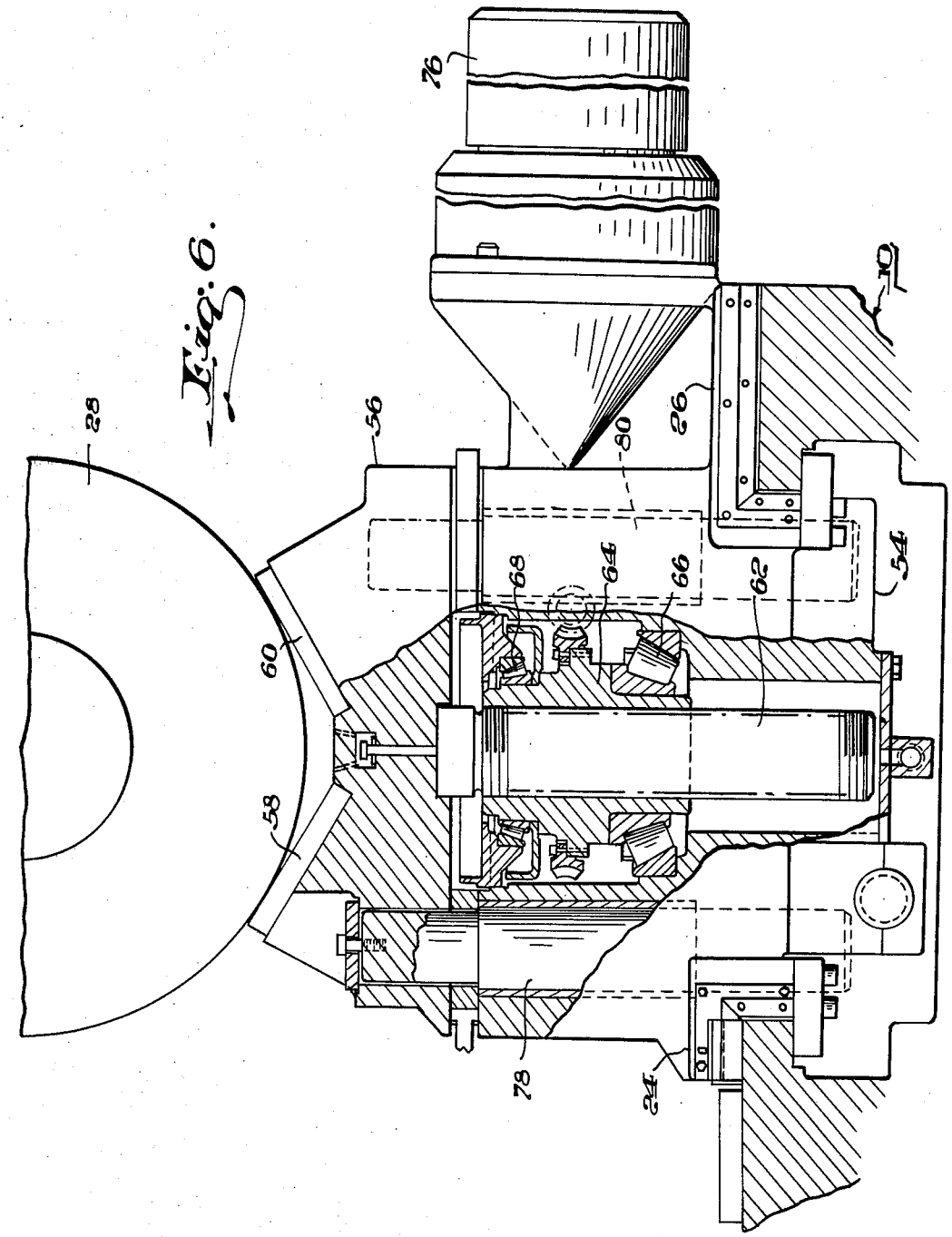

Aug. 17, 1965   A. W. JOHNSON   3,200,679
WORKPIECE LOADING AND UNLOADING APPARATUS
Filed Aug. 2, 1962   8 Sheets-Sheet 6

INVENTOR.
ARTHUR W. JOHNSON.
BY Thomas H. Murray
his
ATTORNEY.

Aug. 17, 1965   A. W. JOHNSON   3,200,679
WORKPIECE LOADING AND UNLOADING APPARATUS
Filed Aug. 2, 1962   8 Sheets-Sheet 8

INVENTOR.
ARTHUR W. JOHNSON
BY Thomas H. Murray
his ATTORNEY

United States Patent Office 3,200,679
Patented Aug. 17, 1965

3,200,679
WORKPIECE LOADING AND UNLOADING
APPARATUS
Arthur W. Johnson, Canfield, Ohio, assignor to Youngstown Foundry & Machine Co., Youngstown, Ohio, a corporation of Ohio
Filed Aug. 2, 1962, Ser. No. 214,220
7 Claims. (Cl. 82—2.5)

This invention relates to workpiece loading and unloading apparatus for metalworking machinery, and more particularly to apparatus for loading or unloading large, heavy workpieces onto a lathe or grinder of the type in which the workpiece is supported for rotation between a headstock and tailstock.

As is known, workpieces are loaded onto a metalworking lathe and certain types of grinders by supporting one end of the workpiece on a center and/or chuck rotatable on a headstock, and by supporting the other end of the workpiece on a center carried on a tailstock. Loading a lathe or grinder has been found to be particularly difficult in the case of large heavy heavy workpieces as, for example, the rolls used in a metalworking rolling mill, the obvious reason being that such rolls may weigh as much as forty tons or more. In the past, it has been the practice to load a heavy workpiece of this sort with the use of an overhead crane. That is, the roll or other workpiece was suspended from the crane hook by chains or cables, and the craneman signaled by a workman on the floor to raise or lower the workpiece and move it back or forth until its ends were centered with respect to the chuck and tailstock centers.

Needless to say, this method of aligning a workpiece of great weight with the headstock and tailstock is extremely cumbersome and, to a certain extent, involves the danger of injury to the workmen who are attempting to move the workpiece into place. A great disadvantage of this method is the possibility of damage to the lathe or grinder itself which can occur, for example, by slamming of the extremely heavy suspended workpiece into the headstock, tailstock or other parts of the equipment. Furthermore, since the crane cannot drop the workpiect (i.e., remove its support) until the workpiece is centered between the points of the tailstock and headstock with the points inserted into countersinks in opposite ends of the workpiece, the possibility always exists of the craneman, because of misjudgment, attempting to elevate the workpiece after the points are inserted, in which case extensive damage can be caused to the lathe or other apparatus. In addition, the operator by misjudgment can cause undue stress on the crane supports and the lathe by improper alignment of centers with the workpiece. The same problems, possibly even more acute, are encountered when the workpiece is unloaded from the lathe or grinder.

In U.S. Patent No. 3,140,626, assigned to the assignee of the present application, apparatus for loading workpieces onto a lathe, grinder or the like is shown wherein the workpiece is initially deposited on cradle structures on the lathe bed and thereafter moved into the correct position between the headstock and tailstock. Specifically, the apparatus of that application includes a pair of cradle structures between the headstock and tailstock of lathe-type apparatus for supporting the opposite ends of a workpiece to be turned on the lathe, means for supporting the cradle structures for movement axially along the lathe bed whereby a workpiece on the cradle structures may be shifted back and forth between the headstock and tailstock, and means on the cradle structures for raising or lowering the opposite ends of the workpiece whereby they may be aligned with the centers of the lathe. In the loading operation, the workpiece is initially deposited on the cradle structures which are thereafter raised or lowered so as to align the workpiece with the tailstock and headstock centers, the cradles being moved along the lathe bed to correctly position the workpiece for loading.

The apparatus shown in the aforesaid Patent No. 3,140,626 although satisfactory for its intended purpose, employs independent, manually-operated handwheels for moving the cradle structures back and forth along the lathe bed. In addition, each cradle structure incorporates independent, manually-operated devices for raising and lowering each end of the workpiece. For workpieces of great size and weight, however, it is preferable to employ motor driven cradle structures. This not only facilitates a more rapid and easier positioning of the workpiece, but also enables the positioning operation to be controlled by an operator from a central control console which incorporates the other controls for the lathe, grinder or other metalworking machine. Thus, by incorporating motor driven cradle structures, the entire loading operation can be controlled by a single operator positioned at the control console.

Accordingly, as an overall object, the present invention seeks to provide new and improved apparatus for loading and unloading a lathe, grinder or the like wherein the apparatus is motor-driven and can be controlled from a central station by a single operator.

Another object of the invention is to provide apparatus of the type described wherein the number of driving motors required is minimized, thereby reducing the overall cost of the equipment.

Still another object of the invention is to provide a workpiece loading device incorporating a pair of elevatable cradles for opposite ends of the workpiece and including means for raising or lowering the cradles in unison whereby the axis of the workpiece may be maintained horizontal during a loading operation.

The above and other objects and features of the invention will become apparent from the following detailed description taken in connection with the accompanying drawings which form a part of this specification, and in which:

FIGURE 1 is an elevational or plan view of one type of lathe incorporating the loading devices of the present invention;

FIG. 2 is a top view of the loading device arrangement for the lathe of FIG. 1;

FIG. 3 is an elevational or plan view of another type of loading device wherein both cradle structures are driven along the lathe bed by means of a single motor, and both cradle structures are elevated or lowered by a single motor;

FIG. 4 is a top view of the loading arrangement of FIG. 3;

FIG. 5 is a partially broken-away elevational view of another type of loading device of the invention;

FIG. 6 is a cross-sectional view taken substantially along line VI—VI of FIG. 5;

Figure 7:
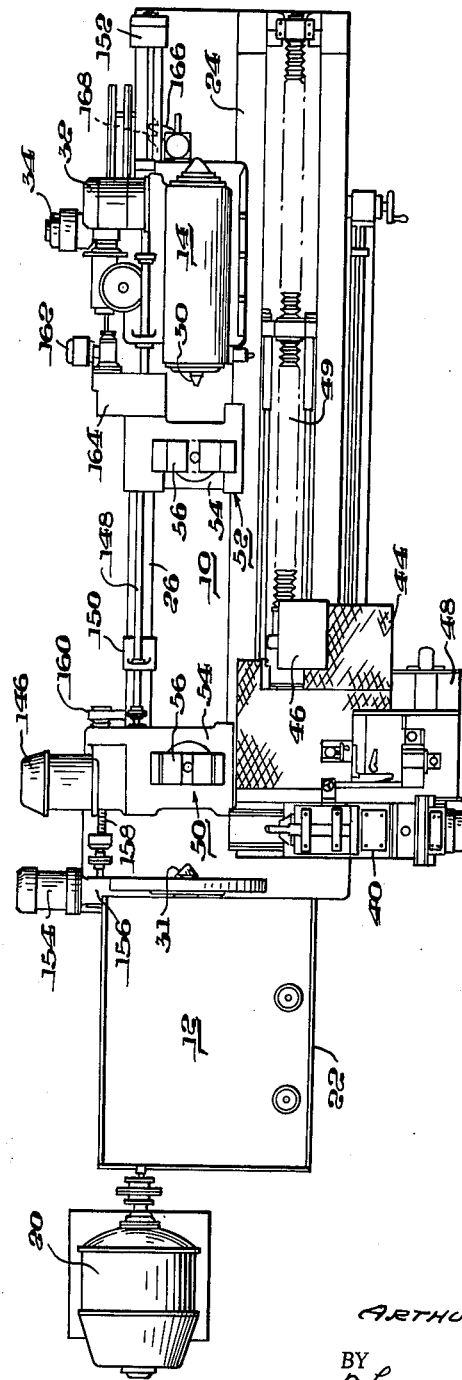
FIG. 7 is a top view of still another type of loading arrangement of the invention.

The various lathes shown herein vary in certain respects; however all incorporate certain basic elements. Accordingly, only the lathe of FIG. 1 will be described in detail, it being understood that the other lathes shown herein incorporate the same basic features. These basic features are identified by like reference numerals in all of the embodiments shown and described.

Referring now to FIG. 1, the lathe shown includes a bed 10 having a headstock 12 at its forward end and a tailstock 14 at its other end. The headstock 12 is fixed in position and carries a rotatable chuck 16 having a plurality of jaws 18 circumferentially spaced around its forward face. The chuck 16 is driven by means of an electric motor 20, the motor being connected through gearing within housing 22 to the chuck 16. The tailstock 14 is slideable axially along the bed 10 on spaced guideways or bedplates 24 and 26, possibly best shown in FIG. 8, and may be locked in position at any point therealong to facilitate workpieces of different lengths. The workpiece 28 itself is carried between a rotatable center 30 which projects outwardly from the tailstock 14 and a corresponding center 31 on the chuck 16. The center 30 may be driven by means of an electric motor 32 shown in FIGS. 7 and 8; while the tailstock 14 is caused to traverse the guideways 24 and 26 by means of an electric motor 34 (FIGS. 7 and 8) which drives a gear 36. The gear 36, in turn, meshes with a rack 38 on the side of the bed 10 beneath guideway 26, the arrangement being such that as the gear 36 rotates in one direction or the other, the tailstock 14 will be caused to traverse the bed 10 on the guideways 24 and 26.

In accordance with usual practice, a tool holder or carrier 40 (FIGS. 1, 7 and 8) is mounted for sliding movement along the bed 10 on guideway or bedplate 24 as well as a third guideway 42 (FIG. 8) which extends to the front of the longitudinal axis between the centers 30 and 31. The tool holder 40, as its name implies, holds the cutting tool for the lathe in position and in engagement with the surface of the workpiece 28 in order that it may be turned on the lathe. Alternatively, the cutting tool may be replaced by a grinder which grinds the surface of the workpiece rather than cutting or milling it. Adjacent the tool holder 40 is an operator's platform 44 (FIGS. 1, 7 and 8) having an operator's console 46 thereon. Steps 48 lead from the ground level up to the operator's platform 44. A screw 49 (FIGS. 7 and 8) is employed to move the tool holder and platform 44 back and forth along the bed 10. As will be understood, the entire operation of the lathe is controlled by levers, pushbuttons or the like mounted on the operator's console 46, the arrangement being such that the entire operation of the lathe, including the loading operation, may be controlled from a single point.

The particular workpiece 28 shown in the drawings is a roll for a metalworking rolling mill and may weigh as much as forty tons or more. In any loading operation, the tailstock 14 will be initially moved by motor 34 to a position where it is separated from the chuck 16 by an amount slightly greater than the length of the workpiece 28. Thereafter, the tailstock 14 is clamped to the bed 10. In order to secure the one end of the workpiece 28 to the chuck 16, the jaws 18, which are mounted on screws or the like, are initially moved radially outwardly to permit one end of the workpiece 28 to be inserted therebetween such that the center 31 will project into a countersink at the left end of the workpiece as shown in FIG. 1. Thereafter, the center 30 on tailstock 14 is moved inwardly into a countersink provided in the right end of the workpiece 28; and finally, the jaws 18 are screwed radially inwardly to secure the end of the workpiece to the chuck and to provide a rotary driving connection between the chuck and the workpiece.

As was mentioned above, the method of loading a workpiece onto the lathe by means of an overhead crane is unsatisfactory due to the fact that the workpiece, being suspended by chains or cables, may swing backwardly or forwardly during the loading operation and cause damage to the lathe. This is particularly true of the tailstock 14 where damage can occur by virtue of the crane- man attempting to hoist the workpiece after the center 30 has been inserted into the countersink in its end.

In accordance with the present invention, the aforementioned difficulties in loading the lathe are eliminated by the use of a pair of cradle structures, generally indicated at 50 and 52. As shown in FIG. 2, each cradle structure 50 or 52 includes a carriage 54 mounted for sliding movement on the guideways or bedplates 24 and 26. In accordance with usual practice in the manufacture of lathes, each carriage is provided with some type of anti-friction or bearing means, such as a wear surface or wear plate, to enable relatively easy movement along guideways 24 and 26. Of course, anti-friction means such as roller bearings or ball bearings could also be used if desired or necessary. Positioned on the carriages 54 for vertical reciprocating movement are cradles 56, the arrangement being such that the carriage 54 for either cradle assembly 50 or 52 may be shifted backwardly or forwardly along the axis of the bed 10 and the cradles 56 elevated or lowered. In loading a lathe with the use of the cradle structures 50 and 52, the workpiece 28 is initially deposited on the upper surfaces of the cradles 56; and these cradles adjusted upwardly or downwardly until the ends of the workpiece are centered slightly below the center 31 of chuck 16 and center 30 of tailstock 14. At this point the workpiece is moved into engagement with the center 31 on chuck 16, the center 30 on tailstock 14 is moved into engagement with the countersink at the other end of the workpiece, and the jaws 18 moved into position to clamp the one end of the workpiece 28. Since the centerline of the workpiece is slightly below the centers at the opposite ends of the lathe, it will be lifted off of the cradles 56 as it is pushed onto the centers. That is, the countersinks and centers are conical in shape, meaning that an incline plane action takes place as the workpiece is loaded onto the centers to lift it from the cradles. Thereafter, the cradles 56 are lowered to permit free rotational movement of the workpiece 28 during a turning or grinding operation.

Figure 8:
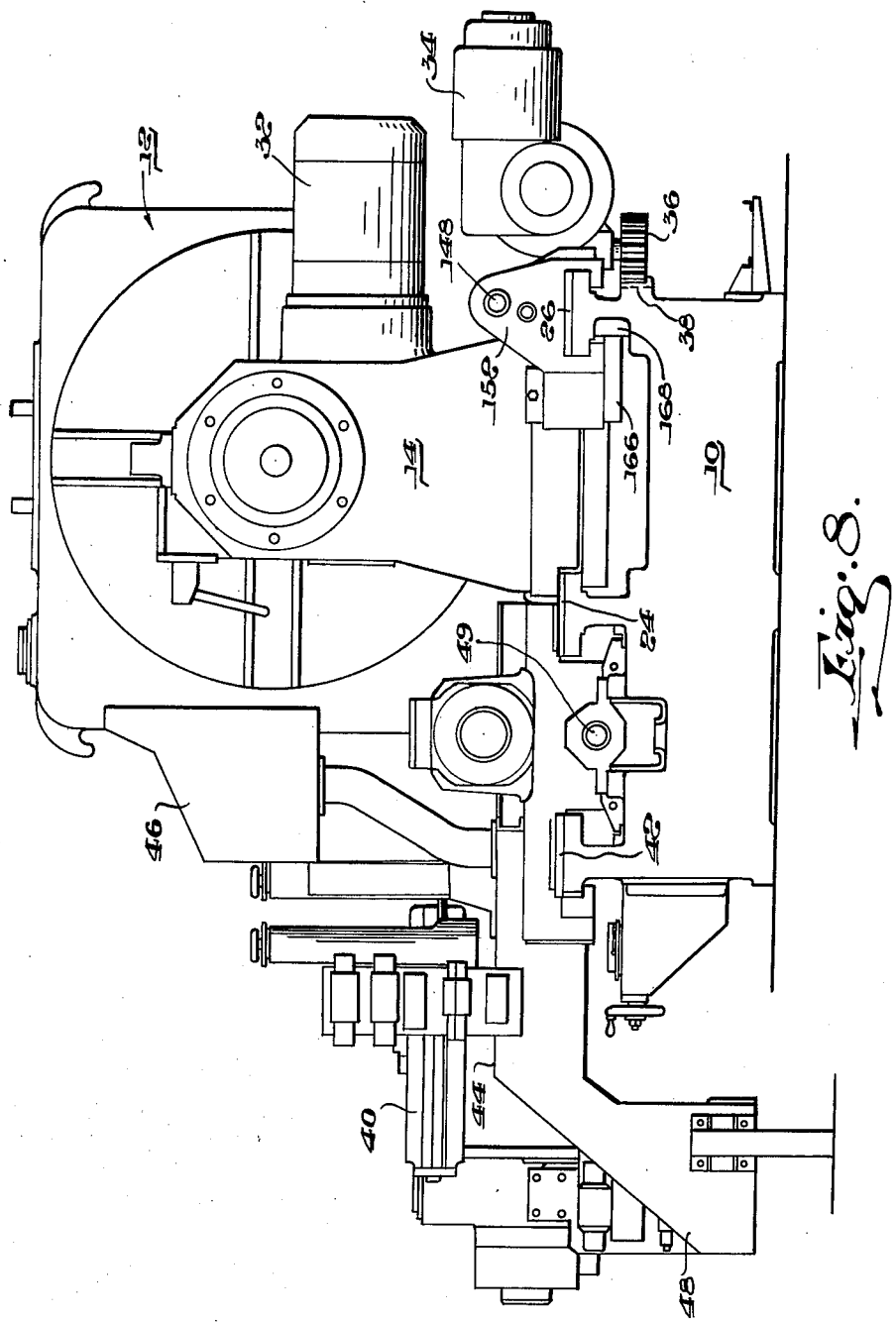
FIG. 8 is an end view of the apparatus shown in FIG. 7.

One method for raising or lowering the cradles 56 is shown in FIGS. 5 and 6. It will be noted that the cradles 56 are V-shaped to accommodate the reduced diameter journals at opposite ends of the workpiece 28. Obviously, the configuration of the cradles 56 will depend upon the diameter of the workpiece at its opposite ends, the larger the diameter, the larger the spacing between the inclined surfaces 58 and 60 at the top of the cradle 56. The cradle 56 is mounted on a screw or spindle 62 which threadedly engages a collar 64 rotatably carried on the carriage 54 by spaced roller bearings 66 and 68. Secured to the outer periphery of the collar 64 is an annular gear 70 which engages a worm 72. The worm 72, in turn, is connected through shaft 74 to an electric motor 76, the arrangement being such that as the motor 76 and worm 72 rotate, the collar 64 will also rotate to raise or lower the cradle 56, depending upon the direction of rotation of the motor. On either side of the screw 62, as best shown in FIG. 6, are a pair of columns 78 and 80, each of which is pressfitted into a bore on the underside of the cradle 56. The lower portions of the columns 78 and 80 slide within cylindrical bearings provided on the carriage 54 such that the columns will permit reciprocation of the cradle 56 while preventing turning of the screw 62 and the cradle carried thereby when the collar 64 is rotated. All of the cradles shown herein, with the exception of that shown in FIG. 8, are elevated or lowered by means of a screw similar to that shown in FIGS. 5 and 6; and although the details of the various arrangements may vary, they all employ, with the exception of FIG. 9, the same basic principle.

Referring again to FIG. 2, it will be noted that the cradle assembly 50 is connected to the piston rod 82 of a hydraulic cylinder assembly 84 mounted beneath the headstock 12. Thus, the cradle structure 50 may be moved axially along the bedplates or guideways 24 and 26 by pressurizing the cylinder 84 in one direction or the other. The cradle 56 on assembly 50 is raised and lowered by means of a motor 76 connected to a worm gear, not shown, through shaft 74 in the manner described in connection with FIGS. 5 and 6. A similar arrangement including a motor 76 and shaft 74 is provided for elevating the cradle 56 on assembly 52. In this latter case, however, the assembly 52, rather than being moved along the guideways or bedplates 24 and 26 by means of a hydraulic cylinder, is provided with a gear, not shown in FIG. 2 but similar to gear 36 shown in FIG. 8, which engages a rack on the side of bed 10. This gear is driven by means of a motor 86 which is connected to the aforesaid gear through shaft 88 and suitable worm drive or bevel gear arrangements contained within housings 90 and 92.

With the arrangement of FIGS. 1 and 2, the operator on platform 44 can control both cradle assemblies 50 and 52 by means of controls on the operator's console 46. That is, he can shift the assembly 50 axially along the bed 10 by actuating the cylinder 84, and can move the assembly 52 along the same bed 10 by energizing motor 86 to rotate in one direction or the other. Both cradles 56 are raised or lowered independently by independently controlling the motors 76.

In FIGS. 3 and 4 another embodiment of the invention is shown wherein one drive motor 94 serves to move both cradle assemblies 50 and 52 along the bedplates 24 and 26 while another, single motor 96 serves to raise or lower both of the cradles 56 in unison. The apparatus for moving the cradle assemblies 50 and 52 axially along the bed 10 includes first and second screws 98 and 100 extending parallel to the longitudinal axis of the bed 10 at the rear side thereof. The screw 98, for example, is carried by spaced bearing blocks 102 and 104 and has its right end, as viewed in FIGS. 3 and 4, connected through shaft 106 to a clutch within housing 108. In a somewhat similar manner, the screw 100 has its opposite ends carried within bearing blocks 110 and 112 and has its one end connected through shaft 114 to the clutch within housing 108. This clutch is connected through shaft 116 (FIG. 4) to the motor 94. The clutch is of the magnetic type and can be controlled from the operator's console 46 to connect the motor 94 to either screw 98 or screw 100. Mounted on the carriage 54 of cradle assembly 52 is a ball screw unit 118 which engages the threads on screw 98 such that when the screw is rotated, the unit 118 and the cradle assembly 52 to which it is connected will be caused to traverse the bed 10. In a similar manner, the carriage 56 of cradle assembly 50 is provided with a ball screw unit 120 which engages the threads of screw 100 such that when this latter screw rotates in one direction or the other, the cradle assembly 50 will be caused to traverse the bed 10.

The motor 96 on cradle assembly 50 is connected through suitable gearing within housing 122 to a worm, similar to worm 72 shown in FIGS. 5 and 6, to cause the cradle 56 on assembly 50 to be raised or lowered. The motor 96 is also connected through the gearing within housing 122 to a shaft 124 which slides within an outer tubular shaft 126 and is keyed thereto such that both shafts 124 and 126 will be caused to rotate in unison. The shafts are mounted on spaced bearing blocks 125 and 127, the shaft 126 being connected through gearing within a housing 128 on the assembly 52 to the cradle raising and lowering mechanism for that assembly, which mechanism is similar in construction to that shown in FIGS. 5 and 6. Suitable bellows 130, 132 and 134 cover the shafts 124 and 126 between the bearing blocks 125 and 127 and between those bearing blocks and the cradle assemblies 50 and 52 to prevent chips, dirt, and the like from fouling the apparatus. Suitable bellows are also provided for the screws 98 and 100 as shown.

With the arrangement of FIGS. 3 and 4, rotation of the motor 96, which is under the control of the operator at console 46, will cause both cradles 56 on the assemblies 50 and 52 to be raised or lowered in unison. This arrangement, of course, requires that the diameters of the portions at the opposite ends of the workpiece which engage the cradles be approximately the same; however it has the advantage of causing the workpiece to be raised with its longitudinal axis horizontal such that the workpiece will be exactly aligned with the centers 30 and 31 without separate adjustment of each cradle. Alternatively, however, a clutch arrangement could be included, similar to that contained within the housing 108, whereby the single motor 96 could be selectively connected to the cradle 56 for either one of the assemblies 50 or 52.

In FIG. 5 another arrangement for moving the cradle assemblies 50 and 52 along the bed 10 is shown which comprises a hydraulic cylinder 136 mounted beneath the headstock 12, not shown in FIG. 5, and having its piston rod 138 connected to the cradle assembly 50. Projecting outwardly from the cradle assembly 50 and parallel to the axis of the bed 10 is a rod 140 adapted to slide through bushings 142 and 144 on the underside of carriage 54 for assembly 52. The carriage 54 for assembly 52 may be selectively clamped to the rod 140, the arrangement being such that when it is so clamped to the rod, actuation of the cylinder 136 will cause both cradle assemblies 50 and 52 to traverse the bed 10.

In the operation of the positioning device of FIG. 5, the cradle assembly 52 is initially clamped to the rod 140 and the cylinder 136 actuated to correctly position assembly 52 along the length of the bed. Thereafter, cradle assembly 52 is released from the rod 140 and clamped to the bed 10, whereupon the cylinder 136 is actuated to correctly position the cradle assembly 50 along the bed while the rod 140 merely slides through the bushings 142 and 144. After the assembly 50 is correctly positioned, it is then clamped to the bed 10 and the positioning operation is completed. This arrangement has the advantage of extreme simplicity while requiring only one motor device 136 for moving both cradle assemblies.

With reference now to FIG. 7, still another embodiment of the invention is shown wherein both cradles 56 are again elevated or lowered by means of a single drive motor 146 mounted on the cradle assembly 50. The motor 146 is connected directly to a worm, similiar to work 72 shown in FIG. 5, for raising or lowering the cradle 56 on assembly 50. Motor 146 is also connected to a rotatable shaft 148 extending along the bed 10 above the bedplate 26. As shown, the shaft 148 is carried at its opposite ends on bearing blocks 150 and 152 mounted on the bedplate 26, and extends through the cradle assembly 52 as well as supports mounted on the tailstock 14. The shaft 148 has a key or the like, not shown, extending along its entire length, which key engages an appropriate gear within the cradle assembly 52 such that rotation of the shaft 148 will cause the cradle 56 on assembly 52 to be raised or lowered in unison with the cradle on assembly 50. In this respect, the apparatus of FIG. 7 is similar in operation to that shown in FIGS. 3 and 4.

In the apparatus of FIG. 7, however, the two cradle assemblies 50 and 52 are not moved along the bed 10 by a single drive motor. Rather, the one cradle assembly 50 nearest the headstock 12 is caused to traverse the bed 10 by means of an electric motor 154 connected through a bevel gear arrangement 156 to a screw 158. The screw 158 has its opposite end mounted on bearing block 160 and engages a ball screw unit, not shown, but similar to units 118 and 120 of FIGS. 2 and 3, on the assembly 50, the arrangement being such that when the motor 154 and screw 158 rotate, the assembly 50 will be caused to traverse the bed in one direction or the other, depending upon the direction of rotation of the motor 154.

The cradle assembly 52, on the other hand, is driven by means of a separate motor 162 connected through a gear reducer 164 to a gear, not shown, which engages the rack 38 shown in FIG. 8. Thus, the assembly 52, as well as the tailstock 14, may be caused to traverse the bed by engagement of a gear with the rack 38. The cradle assemblies 50 and 52 as well as the tailstock 14 incorporate means for clamping them in position along the bed 10, such means for the tailstock 14 comprising a latch 166 adapted to engage any one of a plurality of notches arranged along a rack 168 (FIG. 8) beneath the bedplate 26.

Figure 9:
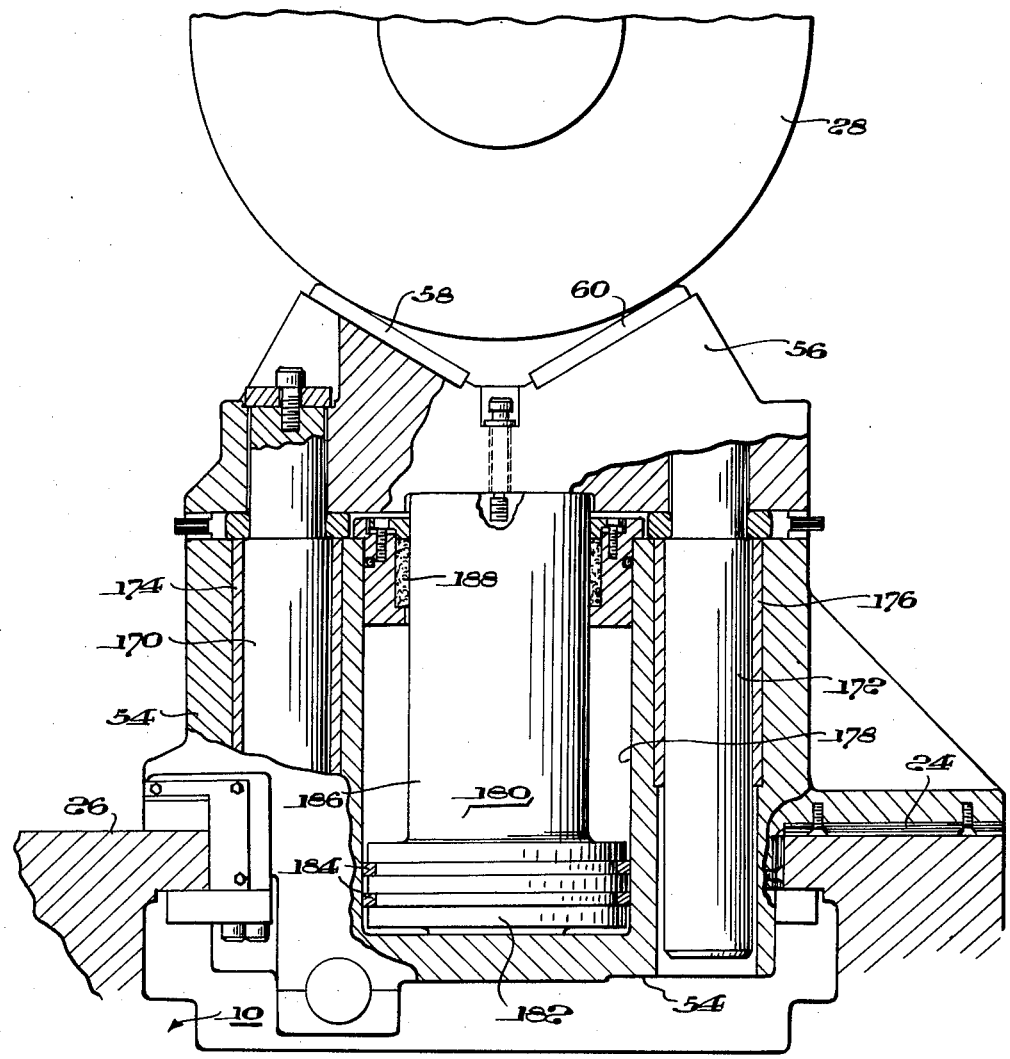
FIG. 9 is a cross-sectional view of one type of cradle structure which may be employed in the present invention wherein the workpiece is elevated or lowered by means of a hydraulic cylinder.

In FIG. 9, another arrangement is shown for raising or lowering the cradle 56 on either one of the cradle assemblies 50 or 52. The arrangement is somewhat similar to that of FIGS. 5 and 6 in that it incorporates columns 170 and 172 which are secured to the underside of the cradle 56 and extend into cylindrical bearings 174 and 176, respectively, in the carriage 54 to prevent twisting of the cradle. Between the columns 170 and 172 is a hydraulic cylinder 178, and received within the cylinder 178 is a piston 180 connected to the underside of the cradle 56. The piston 180 has a lower large diameter portion 182 provided with suitable piston rings 184, and an upper reduced diameter portion 186 which extends through suitable packing 188 at the top of the cylindrical bore 178.

As will be understood, the piston 180 and the cradle 56 carried thereby may be raised by forcing fluid under pressure into the space beneath the piston. Alternatively, the piston and cradle may be lowered by forcing fluid under pressure into the annular chamber formed between the reduced diameter portion 186 and the periphery of the cylindrical bore 178. The pistons 180 for the cradle assemblies 50 and 52 may be raised simultaneously under the control of a single valve, or they may be operated independently, depending upon requirements.

The present invention thus provides means for loading large heavy workpieces onto a lathe or the like wherein the positioning operation can be controlled by a single operator from a console or the like. The invention also provides means for simplifying and reducing the cost of such an arrangement by virtue of the use of single drive motors for spaced cradle structures. Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In apparatus for working upon the surface of a workpiece, the combination of an elongated bed having a headstock at one end and a tailstock at the other end, a pair of cradle structures between the headstock and tailstock for supporting the opposite ends of a workpiece to be worked upon, means for supporting said cradle structures for movement axially along said bed whereby the workpiece on the cradle structures may be shifted back and forth between the headstock and tailstock, single rotating drive motor means located intermediate the headstock and tailstock for moving said cradle structures axially along said bed, first rotating mechanical drive means on one side of the single motor means for transmitting driving power from the single motor means to one of said cradle structures, second rotating mechanical drive means on the other side of the single motor means for transmitting driving power from the single motor means to the other of said cradle structure, clutch means for selectively coupling said drive motor means to either the first or second mechanical drive means, single drive motor means for elevating both of said cradle structures and a workpiece carried thereby, and means for transmitting power from said last-mentioned drive motor means to said cradle structures to elevate the same.

2. In apparatus for working upon the surface of a workpiece, the combination of an elongated bed having a headstock at one end and a tailstock at the other end, a pair of cradle structures between the headstock and tailstock for supporting the opposite ends of a workpiece to be worked upon, means for supporting said cradle structures for movement axially along said bed whereby the workpiece on the cradle structures may be shifted back and forth between the headstock and tailstock, single drive motor means intermediate the headstock and tailstock for moving said cradle structures axially along said bed, a first screw extending parallel to the axis of said bed on one side of the drive motor means for transmitting driving power from the single motor means to one of said cradle structures, a second screw extending parallel to the axis of said bed on the other side of the drive motor means for transmitting driving power from the single motor means to the other of said cradle structures, and a clutch device for selectively coupling said single drive motor means to either the first or second of said screws.

3. In apparatus for working upon the surface of a workpiece, the combination of an elongated bed having a headstock at one end and a tailstock at the other end, a pair of cradle structures between the headstock and tailstock for supporting the opposite ends of a workpiece to be worked upon, each of said cradle structures including a carriage having anti-friction means thereon for engagement with said bed, a vertically reciprocable cradle on each of said carriages and having an upper workpiece engaging surface adapted to engage the underside of a workpiece to be worked upon, and means including a single prime mover and power transmitting means extendible along the length of said bed for connecting the prime mover to both of said cradle structures whereby both of the cradle structures may be raised and lowered by the single prime mover.

4. In apparatus for working upon the surface of a workpiece, the combination of an elongated bed having a headstock at one end and a tailstock at the other end, a pair of cradle structures between the headstock and tailstock for supporting the opposite ends of a workpiece to be worked upon, each of said cradle structures including a carriage having anti-friction means thereon for engagement with said bed, a vertically reciprocable cradle on each of said carriages and having an upper workpiece engaging surface adapted to engage the underside of a workpiece to be worked upon, screw means on each of said cradle structures for elevating or lowering its associated cradle, motor means mounted on one of said cradle structures for driving the screw means on that cradle structure to raise or lower the cradle thereon, and axially expansible means extending between said cradle structures parallel to the axis of said bed for transmitting driving force from said motor means to the screw means on the other of said cradle structures.

5. The combination of claim 4 wherein the axially expansible means comprises a tubular shaft operatively connected to the screw means on one of said cradle structures, a second shaft reciprocable within said tubular shaft and keyed thereto whereby both shafts will turn in unison, and means operatively connecting said second shaft to the screw means on the other of said cradle structures.

6. In apparatus for working upon the surface of a workpiece, the combination of an elongated bed having a headstock at one end and a tailstock at the other end, a pair of cradle structures between the headstock and tailstock for supporting the opposite ends of a workpiece to be worked upon, each of said cradle structures including a carriage having anti-friction means thereon for engagement with said bed, a vertically reciprocable cradle on each of said carriages and having an upper workpiece engaging surface adapted to engage the underside of a workpiece to be worked upon, a single prime mover for raising and lowering both of said cradles, power transmitting means extendible along the length of said bed for operatively connecting the cradles to the prime mover, single motor means for moving said cradle structures along the length of said bed, and mechanical drive means for transmitting driving power from the single motor means to both of said cradle structures.

7. In apparatus for working upon the surface of a workpiece, the combination of an elongated bed having a headstock at one end and a tailstock at the other end, a pair of cradle structures between the headstock and tailstock for supporting the opposite ends of a workpiece to be worked upon, each of said cradle structures including a carriage having bearing means thereon for engagement with said bed, a vertically reciprocable cradle on each of said carriages and having an upper workpiece engaging surface adapted to engage the underside of a workpiece to be worked upon, means for moving said cradle structures axially along said bed, a single prime mover for raising and lowering both of said cradles, and power transmitting means operatively connecting the cradles to the single prime mover while permitting movement of said carriages toward and away from each other without disconnecting the power transmitting means from the cradles.

References Cited by the Examiner
UNITED STATES PATENTS

| | | | |
|---|---|---|---|
| 826,679 | 7/06 | Marks | 82—45 X |
| 1,093,219 | 4/14 | Vaughan | 82—2.5 |
| 2,032,597 | 3/36 | Shaw | 82—21.2 |
| 2,186,770 | 1/40 | Schurr | 10—154 |
| 2,451,147 | 10/48 | Beachler | 82—9 |
| 2,523,563 | 9/50 | Foreman | 214—1 |
| 2,546,687 | 3/51 | Brandenburg | 82—21.2 X |

ANDREW R. JUHASZ, *Primary Examiner.*

WILLIAM W. DYER, Jr., *Examiner.*